J. E. PAULSON.
SEED SPACING AND DROPPING MECHANISM FOR PLANTERS.
APPLICATION FILED JUNE 23, 1919.

1,328,846.

Patented Jan. 27, 1920.

John E. Paulson, INVENTOR.
BY his ATTORNEY:
A. M. Carlsen.

UNITED STATES PATENT OFFICE.

JOHN E. PAULSON, OF MINNEAPOLIS, MINNESOTA.

SEED SPACING AND DROPPING MECHANISM FOR PLANTERS.

1,328,846.  Specification of Letters Patent.  Patented Jan. 27, 1920.

Application filed June 23, 1919. Serial No. 306,221.

*To all whom it may concern:*

Be it known that I, JOHN E. PAULSON, a citizen of the United States, residing at Minneapolis, in the county of Hennepin and State of Minnesota, have invented a new and useful Seed Spacing and Dropping Mechanism for Planters, of which the following is a specification.

This invention relates to seed dropping mechanism for planting machines, and the main object is to provide new and efficient means for dropping potatoes or other seeds different distances apart during different operations and to do so with accuracy.

Figure 1:
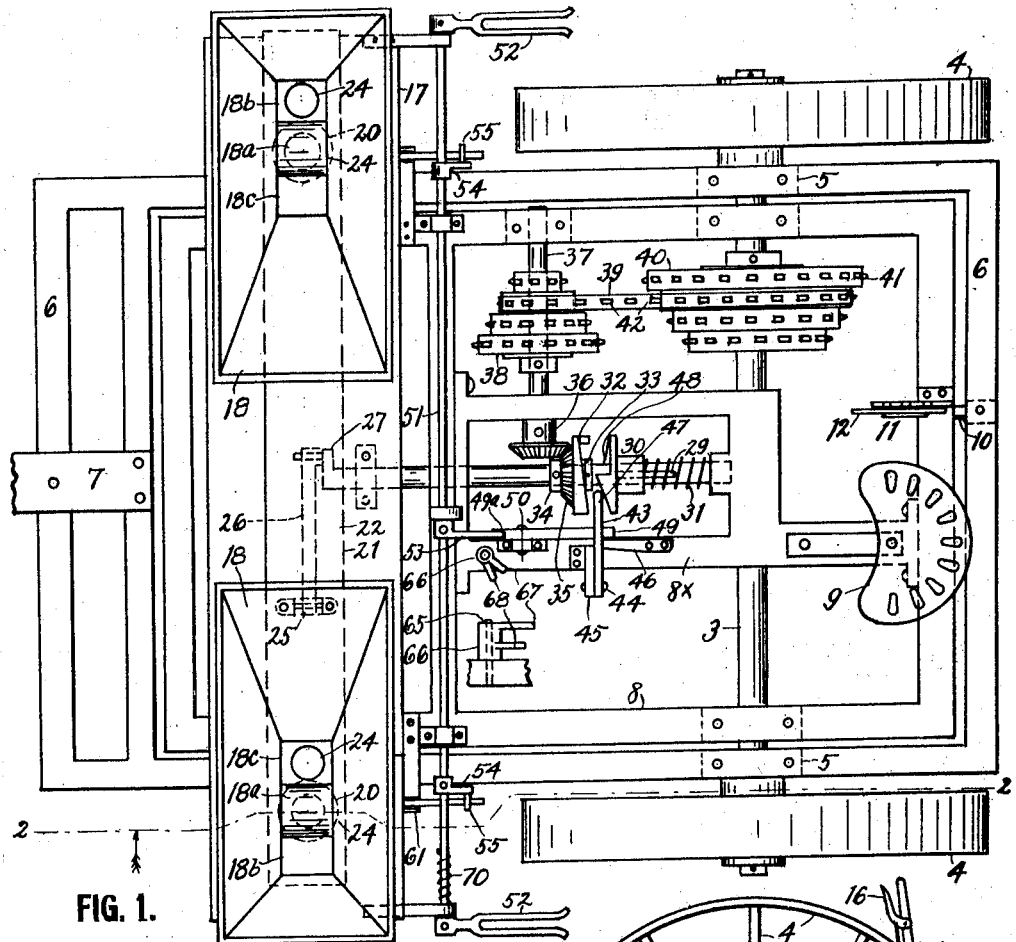
Figure 2:
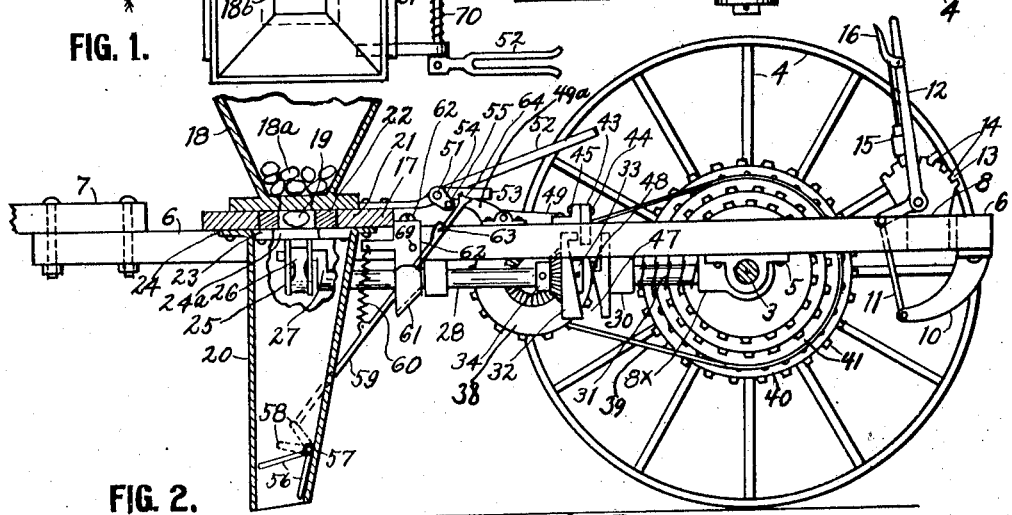

In the accompanying drawing Figure 1, is a top or plan view of a planting machine embodying my improvements. Fig. 2 is a section on the line 2—2 in Fig. 1 with the seat 9 omitted.

Referring to the drawing by reference numerals, 3 designates the main axle of the machine; at each end of the axle is journaled a ground wheel 4, having in the hub a ratchet arrangement (not shown) by which to rotate the axle when the machine is being drawn forward.

Mounted by bearings 5 on said axle is a main frame 6 having a pole 7 by which it is drawn and steered. Within said main frame is tiltingly journaled on the axle a second frame 8, the middle portion 8$^x$ of which is preferably made of iron. Said frame may carry a seat 9. The rear ends of the frames are connected together by a bracket 10, rod 11 and a hand-lever 12, by which to tilt the inner frame, said lever being pivoted at 13 to a notched section 14 in which may engage a dog 15 carried by the hand lever and controlled by a finger lever 16 on same.

Secured upon the forward end of the tiltable frame 8 is a hopper base 17, upon which are fixed two hoppers 18, from which to feed seed (in the present illustration potatoes 19) into two dropping tubes 20, so as to plant two rows simultaneously.

The hopper base 17 is formed with a longitudinal central slot 21, in which reciprocates a feed slide 22, which is supported on two cleats 23, each of which forms a support for a potato when it drops from the hopper into an aperture 24 in the slide, (see Fig. 2). Each potato is then moved by the slide over an aperture 24$^a$ in the support 23 and is thus dropped into the adjacent tube 20. The aperture 24$^a$ is arranged directly below a cross bar 18$^a$, which divides the outlet of each hopper into two apertures 18$^b$, 18$^c$, and each end of the slide is provided with two apertures 24 and 24, one of which at a time moves a potato in under the cross-bar 18$^a$ while the other receives a potato or a piece of a potato if they are cut in pieces, or other seed from one of the outlets of the hopper.

The slide is reciprocated by the following mechanism: To the under side of the slide is attached at 25 one end of a pitman 26, which is operated by a crank 27 of a shaft 28 rotatable in suitable bearings as shown. On said shaft is slidably keyed by a key 29 a clutch member 30, which by a spring 31 is at all times impelled toward a clutch member 32. The latter member is rotatable on the shaft between two collars 33, 34, and affixed to it is a bevel gear 35, which is driven by a bevel gear 36 fixed on a transverse shaft 37. The latter shaft may be rotated by any suitable gearing but I have shown it as provided with a belt cone 38, which is driven by a belt 39 and a similar but larger cone 40 fixed on the axle 3. Both cones are provided with teeth or studs 41 for engagement with perforations 42 with belt 39, so as to prevent slipping of the belt on the cones.

The clutch member 30 may be held disengaged from the member 32, by a shifter arm 43, which is pivoted at 44 to a bracket 45 and is normally held down to its limit by a spring 46. In said position the shifter will engage the first inclined face, 47 or 48, moving into contact with it, and thus the spring 31 will yield and the clutch members become separated; but the moment the arm 43 is raised above the clutch by a beam lever 49, which is fulcrumed at 50, the spring 31 will throw the slidable clutch member into engagement with its mate, 32, which latter being in rotary motion will at once rotate the member 30 and thereby the shaft 28 until the crank 27 has moved the seed slide to its limit either to the right or the left side in the machine, so that two of its apertures may drop potatoes into the tubes 20 while the other two are being charged from the hoppers.

In order to make the machine convertible also into a check rower when so desired, a light rock shaft 51 is journaled across the frame 8 and provided with forks 52 for a check row wire (not shown) to operate in as usual in check rowers. On said shaft is also fixed an arm 53, adapted to press down the front arm 49ª of the beam lever 49 when so desired. The shaft is also provided with two other rocker arms 54, having each a lateral peg 55.

Each dropping tube 20 has its lower end provided with a valve 56 pivoted at 57 and provided with a rocker arm 58, said valve is normally held closed by a rod 59 and a spring 60. Said rod is guided in a U-shaped bend 61 of a bracket 62 secured on the frame, and is provided with a cam 63, and a crutch-shaped notch 64 in its upper end. Pivoted at 65 upon the frame is a catch having two fingers 67, 68.

In the operation of the machine, if the seeds are to be planted about three feet apart in each row the catch 66, 67, 68, is turned into the idle position shown, and a regular check row line or wire employed, and as the machine is driven forward the crank 27 will then operate the slide and drop the seed upon the valves 56, where it remains until the check row line engages one of the forks 52 and swings it to a rearward incline about as shown in Fig. 2. This movement or partial turning of the shaft 51 causes the pegs 54 to strike in the crutches 64 and open the valves by pushing the rods down. In such downward movement the cams 63 come in contact with fixed pins 69 which cause the rods to swing with the crutches out of engagement with the pins 54 and allow the springs 60 to raise the rods and close the valves 56 before further seed is dropped upon them. As the machine advances further the forks 52 are brought to almost horizontal position by the check row line. This further turning of shaft 51 causes the arm 53 to press down the arm 49ª of lever 49, which then by its other end raises the clutch shifter 43 and thus allows the clutch members to come together and cause a half turn of the crank shaft, whereby the seed slide is pushed in the opposite direction; this done the obstruction on the check row line has passed the fork and the latter is raised to about vertical position by a torsion spring 70, or other suitable spring. Said returning of the fork shaft also raises the arm 53, whereby the shifter is permitted to disengage the coupling members and stop the rotation of the crank shaft, and everything is ready for the next action of the check row line on one of the forks.

For ordinary planting of potatoes or other seeds, say from eight to eighteen inches between the hills, the check row line is dispensed with and the speed of the crank shaft determined by the position of the belt 39 on the cones, and the clutch members are left in constant engagement by turning the finger 68 of the catch 66 upon the lever arm 49ª; and the valves are held open by placing the finger 67 of the catch upon the arm 53.

What I claim is.

In a two-row planting machine having a frame and two ground wheels, two seed hoppers mounted on the frame, two dropping tubes one below each hopper, a seed feeding slide arranged to reciprocate in the bases of the hoppers, operative connection with a clutch in it between said slide and the ground wheels, a valve in the lower end of each dropping tube, a guided rod connected with each valve to open it, a spring acting on each rod to close its valve, a light rock-shaft journaled across the frame of the machine and provided with check-row forks and a spring for holding said forks in an upward position, two radial arms on the shaft arranged to engage each of them one of the valve rods to open the valves, a peg on the frame near each valve rod and a cam on each rod arranged to contact with the peg and disengage the rod from the radial arm shortly after the valve has been opened; a third rocker arm on said shaft, and means operated by said third arm for starting the clutch into action after each closing of the valves, and automatic means for disengaging the clutch again.

In testimony whereof I affix my signature.

JOHN E. PAULSON.